US012576981B2

(12) United States Patent  
Lanfant et al.

(10) Patent No.: US 12,576,981 B2  
(45) Date of Patent: Mar. 17, 2026

(54) ACOUSTIC TREATMENT DEVICE FOR AN AIRCRAFT PROPULSION ASSEMBLY, AND ITS METHOD OF MANUFACTURE

(71) Applicant: SAFRAN, Paris (FR)

(72) Inventors: Nicolas Pierre Lanfant, Moissy-Cramayel (FR); Hugues Laurent Alglave, Moissy-Cramayel (FR); Patrick Dunleavy, Moissy-Cramayel (FR)

(73) Assignee: SAFRAN, Paris (FR)

( * ) Notice: Subject to any disclaimer, the term of this patent is extended or adjusted under 35 U.S.C. 154(b) by 232 days.

(21) Appl. No.: 18/567,107

(22) PCT Filed: Jun. 8, 2022

(86) PCT No.: PCT/FR2022/051084

§ 371 (c)(1),  
(2) Date: Dec. 5, 2023

(87) PCT Pub. No.: WO2022/258921

PCT Pub. Date: Dec. 15, 2022

(65) Prior Publication Data

US 2024/0270400 A1 Aug. 15, 2024

(30) Foreign Application Priority Data

Jun. 8, 2021 (FR) ...................................... 2106052

(51) Int. Cl.  
*B64D 33/02* (2006.01)

(52) U.S. Cl.  
CPC ...... *B64D 33/02* (2013.01); *B64D 2033/0206* (2013.01)

(58) Field of Classification Search  
CPC ........................ B64D 33/02; B64D 2033/0206  
See application file for complete search history.

(56) References Cited

U.S. PATENT DOCUMENTS

| | | | | |
|---|---|---|---|---|
| 6,123,170 A * | 9/2000 | Porte | ...................... | B64D 33/02 239/265.17 |
| 10,823,059 B2 * | 11/2020 | Herman | .................. | B32B 5/024 |
| 2013/0133977 A1 | 5/2013 | Hurlin et al. | | |
| 2015/0027629 A1 | 1/2015 | Butler et al. | | |
| 2018/0230905 A1 | 8/2018 | Riou et al. | | |

(Continued)

OTHER PUBLICATIONS

International Search Report mailed Sep. 9, 2022, issued in corresponding International Application No. PCT/FR2022/051084, filed Jun. 8, 2022, 6 pages.

(Continued)

*Primary Examiner* — Forrest M Phillips  
(74) *Attorney, Agent, or Firm* — CHRISTENSEN O'CONNOR JOHNSON KINDNESS PLLC

(57) ABSTRACT

An acoustic treatment device for an aircraft propulsion assembly includes two skins that enclose an acoustic structure. The acoustic structure has a cellular structure with hollow cells and a structure of shapes with protruding shapes, each of which is engaged in a different hollow cell of the cellular structure. The structure of shapes additionally has stubs designed to fit into the hollow cells of the cellular structure and to allow the acoustic treatment device to be fixed to a component of the aircraft propulsion assembly.

11 Claims, 8 Drawing Sheets

(56)                    References Cited

U.S. PATENT DOCUMENTS

| 2020/0265821 | A1* | 8/2020 | Riccobene | ............ | B29C 39/026 |
| 2021/0049993 | A1* | 2/2021 | Cazeaux | ................ | B64D 33/00 |
| 2021/0102513 | A1* | 4/2021 | Le Boulicaut | ......... | F02K 1/827 |
| 2022/0242018 | A1* | 8/2022 | McNulty | .............. | G10K 11/168 |

OTHER PUBLICATIONS

Written Opinion mailed Sep. 9, 2022, issued in corresponding International Application No. PCT/FR2022/051084, filed Jun. 8, 2022, 8 pages.

* cited by examiner

ACOUSTIC TREATMENT DEVICE FOR AN AIRCRAFT PROPULSION ASSEMBLY, AND ITS METHOD OF MANUFACTURE

FIELD OF THE DISCLOSURE

The disclosure relates to the field of the acoustic treatment in aircraft and concerns, in particular, an acoustic treatment device for an aircraft propulsion assembly and its method of manufacture.

BACKGROUND

The prior art includes, in particular, the documents US-A1-2020/265821, US-A1-2015/0027629, US-A1-2018/0230905 and US-A1-2013/0133977.

For the acoustic treatment in aircraft, and in particular to attenuate acoustic waves propagating in the various structures of an aircraft, it is known to use acoustic treatment devices presented in the shape of a "sandwich" in which two skins enclose a cellular structure, typically a honeycomb structure, the properties of which are adapted to attenuate acoustic waves in a given frequency range.

This type of acoustic treatment device is typically designed to be installed on components of a propulsion assembly comprising a nacelle and an aircraft engine, such as. It can be installed, for example, on nacelle panels, engine panels or on platforms located between stator blades or rotor blades.

FIG. 1A illustrates an example of an acoustic treatment device 101 in which two plates 103 and 105 made of composite material, i.e., the skins of the acoustic treatment device, are mounted by gluing to a honeycomb structure 107.

In a known way, the honeycomb structure 107 is made up of hollow cells, hexagonal in cross-section, arranged in a periodic arrangement. In addition, the skin 103 of the acoustic treatment device, generally referred to as the acoustic skin, is porous to improve its acoustic performance, whereas the other skin 105 is not porous and is simply a so-called closure skin.

The acoustic performance of such a device is mainly linked to its cellular structure and, in particular, the frequency range in which acoustic waves are attenuated by the device depends in particular on the geometry and dimensions of the cells in the cellular structure.

In particular, in the conventional acoustic treatment technologies, the length of the neck is small compared to the height of the cavity of the cellular structure. More specifically, in the conventional technologies, the length of the neck is equal to the thickness of a composite sheet-metal wall (carbon+resin) which constitutes the wetted surface of the treatment, as the neck is obtained by simply perforating this wall.

The operation of the Helmholtz resonator thus formed is optimised by sizing the air cavity so as to obtain the maximum acoustic velocity at the level of the neck. This optimisation requires cavity heights of the order of a quarter of the wavelength of the main frequency to be processed. This means that for a sound wave at a frequency of 100 Hz in ambient air, with a wavelength of 3.4 metres, a necessary cavity height of:

$$\frac{\lambda}{4} = \frac{3.4}{4} = 0.85 \text{ m} \qquad \text{[Math 1]}$$

It also offers very interesting properties in terms of the wide frequency bandwidth covered.

However, the current trends in the optimisation of the propulsion systems are oriented towards reducing the number of blades and the rotational speed of rotating assemblies such as the fan in shrouded architectures (e.g., a turbofan) and/or the propellers in non-shrouded architectures (e.g., an engine with a non-shrouded fan, in particular a contra-rotating open rotor). The result is a lowering of acoustic radiation frequencies.

The optimisation of the treatment panels therefore requires an increase in their thickness in order to increase the height of the cavity and thus reduce the tuning frequency of the resonant cavities in the panels. This makes the panels incompatible with the weight and footprint constraints associated with the new UHBR (Ultra High Bypass Ratio) architectures, i.e., with very high bypass ratios.

In fact, the implementation of conventional acoustic treatments without cones and tuned to these frequencies requires cavities 20 to 25 cm thick. And, with so-called slim nacelle sizes and an acoustic signature starting at particularly low frequencies, the turbofans with very high bypass ratios cannot use such acoustic treatment panels and therefore require the use of specific acoustic coatings. More specifically, in addition to conventional absorbent structures that treat medium and high frequencies, there is a need for acoustic treatment that can effectively attenuate low frequencies in the range 150 to 800 Hz with acoustic treatment panels with a small footprint.

It is always possible to dimension the Helmholtz resonator so that it is effective at lower frequencies, for a reduced radial footprint, for example, by adjusting both the height of the neck and the volume of the resonant cavity.

The downside of this type of dimensioning under the constraint of a given small footprint is that the frequency band over which the treatment acts optimally is drastically reduced as the frequency decreases. In fact, engaging a cone into the resonant honeycomb cavities allows to increase the height of the neck, reducing the height of the cell to 7 or 8 cm rather than the 20 to 25 cm for a cell without an internal cone.

In addition, known manufacturing methods restrict the range of geometries that can be used for cells with honeycomb structures such as that shown in FIG. 1A. As a result, the accessible frequency range (for the acoustic attenuation) is intrinsically limited.

One possible approach to extending the range of frequencies in which acoustic waves are attenuated is to stack several cellular structures with cells of different dimensions and therefore intended to generate acoustic attenuation in different frequency ranges.

As shown in FIG. 1B, the acoustic treatment device 109 consists of two skins 111 and 113 and two distinct cellular structures 115 and 117 separated by an intermediate layer 119, which is a porous layer also known as a "septum". This type of stacking is referred to as DDOF (Double Degree Of Freedom), as opposed to a simple structure, as shown in FIG. 1A, known as SDOF (Single Degree Of Freedom).

However, these approaches are also limited in that, in order to generate acoustic attenuation at low frequencies, they require a significant increase in the height of the hollow cells of the cellular structure and therefore in the overall thickness of the acoustic treatment device. However, the respect of certain constraints footprint, and in particular the fact not to impact the drag of a propulsion assembly, prevents the acoustic treatment device from being extended beyond certain limits.

To overcome this problem, it is known to incorporate into the acoustic treatment device shapes specifically designed to attenuate low frequencies without significantly increasing the overall thickness of the device. Typically, protruding shapes, such as cones, are engaged into the cells of the cellular structure. The shape and precise dimensions of the shapes used are adapted to generate an acoustic attenuation in a given frequency range.

One known approach is to engage cones into the cells of the cellular structure in a discrete manner. However, this approach is limited in terms of the usable surface area that can be treated and, consequently, in terms of acoustic performance, since the number of cones determines the level of acoustic attenuation obtained.

Another well-known approach involves the integration of cones (which are also engaged in pockets) linked together by bars. In this case, in practice, the clearance existing between the cones and the cells of the cellular structure tends to deteriorate the acoustic performance of the device. In fact, it is necessary to position the bars in notches of a cellular structure, which requires highly complex geometric control.

A final approach consists of introducing into the device a structure formed by a plate from which cones emerge. These cones are engaged into the pockets (i.e., the cells) of the cellular structure when the device is mounted. This type of structure is, in particular, manufactured by injection or compression, allowing a thin acoustic treatment device configured to attenuate low frequencies.

However, this latter approach is also limited by the fact that, to enable the acoustic treatment device to be attached to a component of a propulsion assembly, it is necessary to fill certain cells in the cellular structure in order to pass the fastening means that allow the mounting.

In particular, the mounting of the device requires certain cells of the cellular structure to be filled with a coating, resin or sealant. This operation, known as "potting", has a number of disadvantages:

Firstly, it is an additional operation in the manufacturing process. Secondly, it necessarily involves a drying time. And, thirdly, it suffers from imprecision, resulting in more cells than necessary being filled in fine.

As a result, it leads to higher production costs and a loss of treated surface area due to inaccurate application of the sealant, coating or resin.

SUMMARY

The present disclosure offers a solution to these disadvantages.

To this end, according to a first aspect, the disclosure relates to a an acoustic treatment device for an aircraft propulsion assembly, this device comprising a first skin and a second skin enclosing an acoustic structure, the acoustic structure comprising a cellular structure, comprising a plurality of hollow cells, and a structure of shapes, comprising a plurality of protruding shapes, and so that each of the protruding shapes engages into a different hollow cell of the cellular structure, the acoustic treatment device being characterised in that the structure of shapes further comprises at least one stub of a shape distinct from that of the protruding shapes, this stub being designed to fit into at least one hollow cell of the cellular structure and to enable the acoustic treatment device to be fixed to a component of the aircraft propulsion assembly.

The acoustic treatment device according to the disclosure may comprise one or more of the following characteristics, taken alone or in combination with each other:

the dimensions of each stub of the structure of shapes are designed so that each stub fits into a different hollow cell of the cellular structure.

the dimensions of each stub of the structure of shapes are designed so that each stub fits into a hollow area of the cellular structure formed by several adjacent hollow cells.

each stub comprises a through hole designed to allow fastening means to pass through.

each hole comprises a machined portion, for example a bore, milling or counterbore, adapted to allow the engagement of a head of the fastening means so that the head of the fastening means does not emerge from the hole.

According to a second aspect, the disclosure also relates to an aircraft propulsion assembly comprising at least one acoustic treatment device according to the first aspect.

Finally, according to a third aspect, the disclosure relates to a method of manufacturing an acoustic treatment device according to the first aspect, comprising:

manufacturing the structure of shapes;

mounting the structure of shapes with the cellular structure to form the acoustic structure; and, mounting the acoustic structure with the first skin and the second skin so as to form the acoustic treatment device.

The manufacturing method according to the disclosure may comprise one or more of the following characteristics, taken in isolation from one another or in combination with one another:

the method also comprises drilling the acoustic treatment device into the stubs of the structure of shapes.

during the manufacture of the structure of shapes, holes are formed in the stubs of the structure of shapes from protruding parts of a mould or from inserts positioned in a mould.

during the manufacture of the structure of shapes, the stubs of the structure of shapes are made with an insert positioned in a mould.

DESCRIPTION OF THE DRAWINGS

The disclosure will be better understood, and other details, characteristics and advantages of the present disclosure will become clearer from the following description made by way of non-limiting example and with reference to the attached drawings, in which.

The elements having the same functions in the different embodiments have the same references in the figures.

DETAILED DESCRIPTION

With reference to FIGS. 2 to 5, we will now describe an acoustic treatment device according to one embodiment of the disclosure.

The acoustic treatment device 401 is designed to be installed on a component of an aircraft propulsion assembly. Such an assembly comprises an aircraft nacelle and an aircraft engine and such a component may be, for example, a nacelle panel, an engine panel, a platform between stator blades or between rotor blades.

Figure 4:
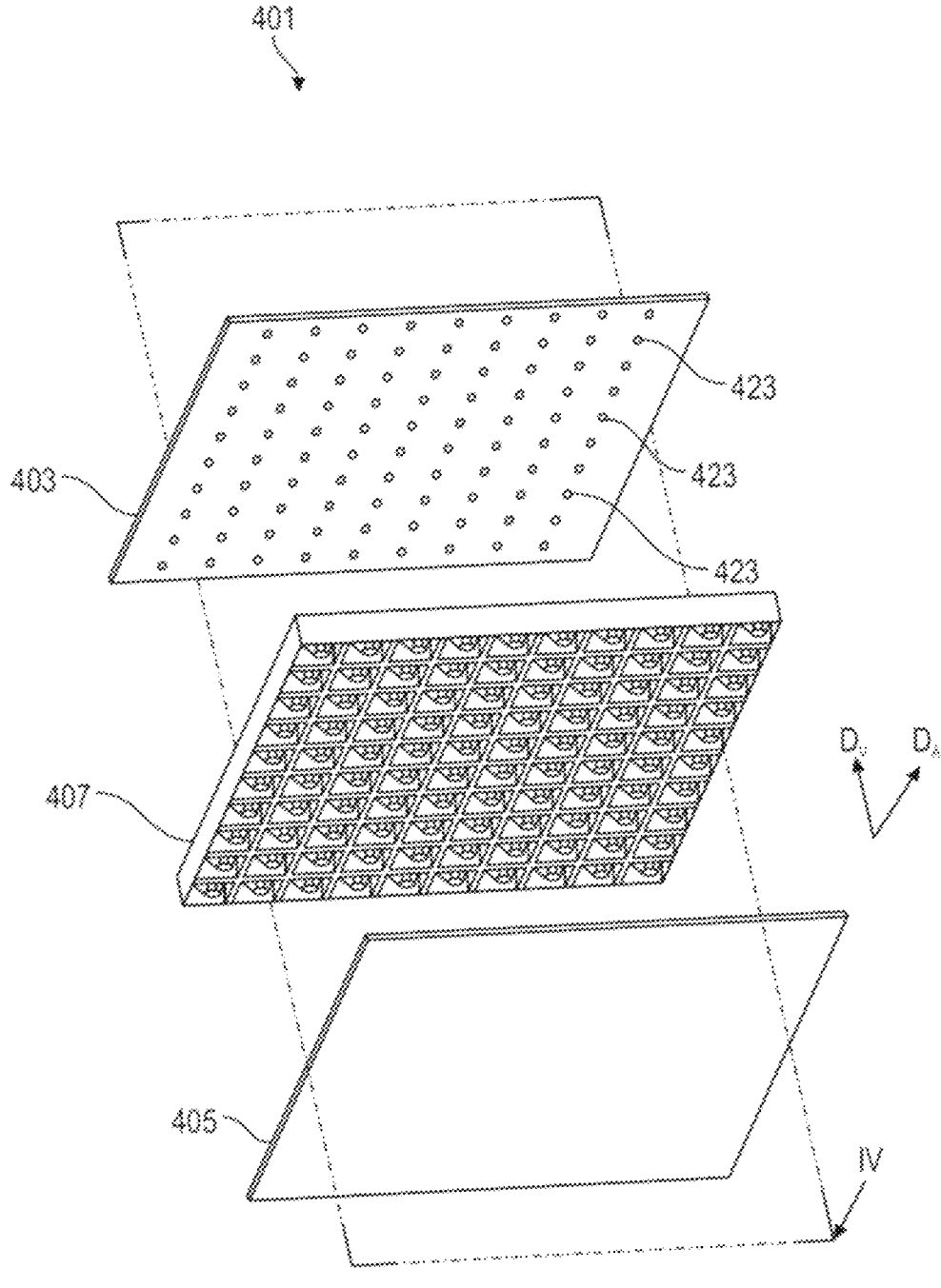
FIG. 4 is a schematic diagram of the mounting of an acoustic treatment device according to one embodiment of the disclosure.

The device 401 comprises a first skin 403 and a second skin 405 enclosing an acoustic structure 407. The first skin 403 and the second skin 405 can be, for example, sheets of composite material. Furthermore, as can be seen in FIG. 4, in the example shown, the first skin 403 is porous, i.e., it is pierced by orifices 423 in order to improve its acoustic properties.

Figure 1A:
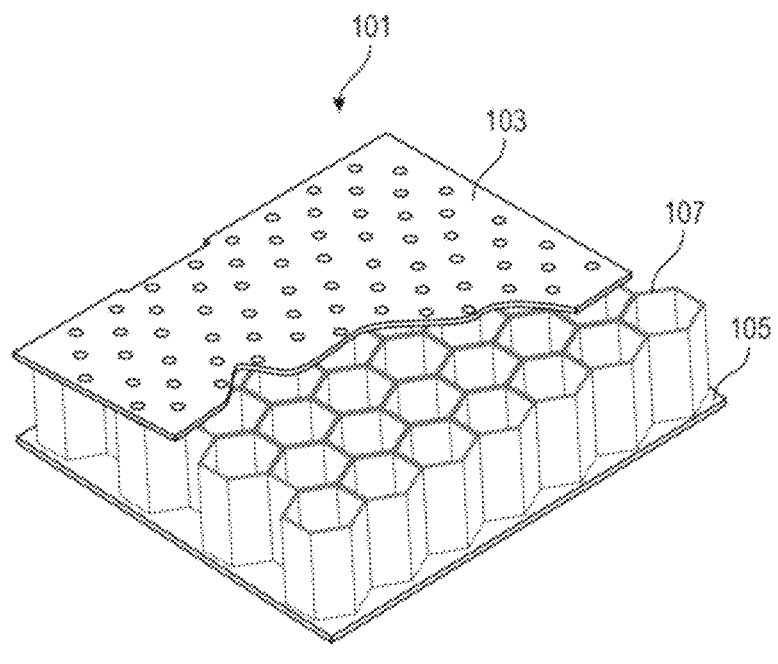
FIG. 1A is a schematic representation of an acoustic treatment arrangement according to the prior art.
Figure 1B:
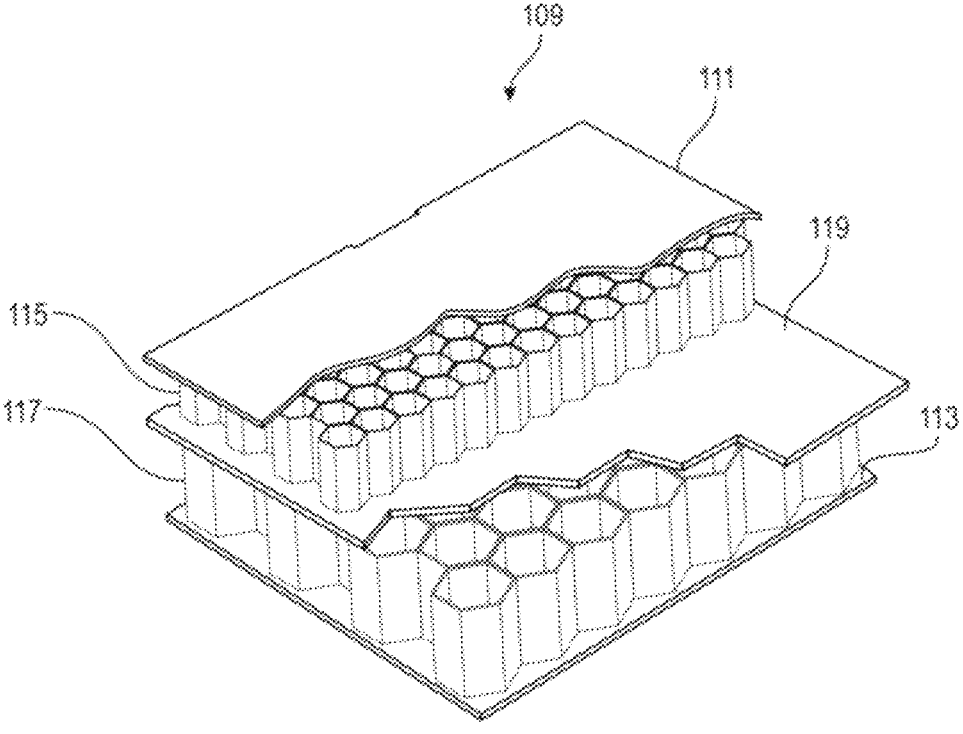
FIG. 1B is a schematic representation of an acoustic treatment arrangement according to the prior art.
Figure 2:
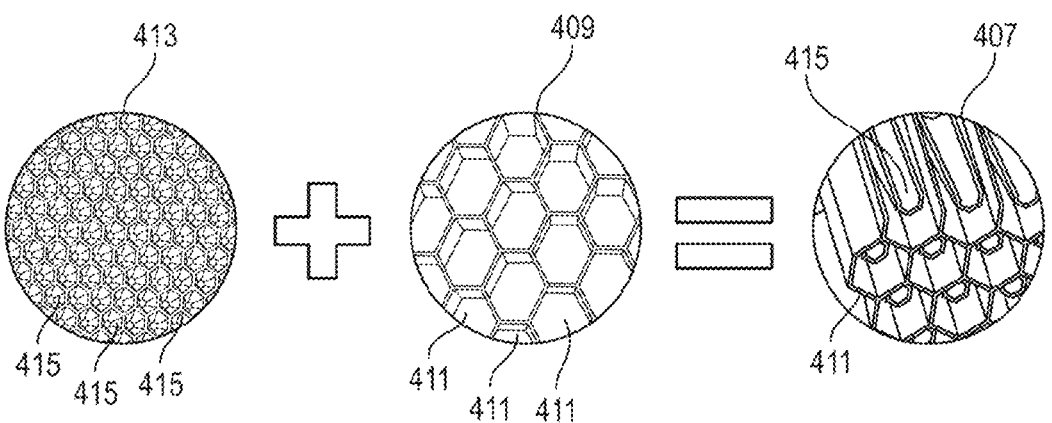
FIG. 2 is a schematic diagram of the mounting of the acoustic structure according to one embodiment of the disclosure.
Figure 3:
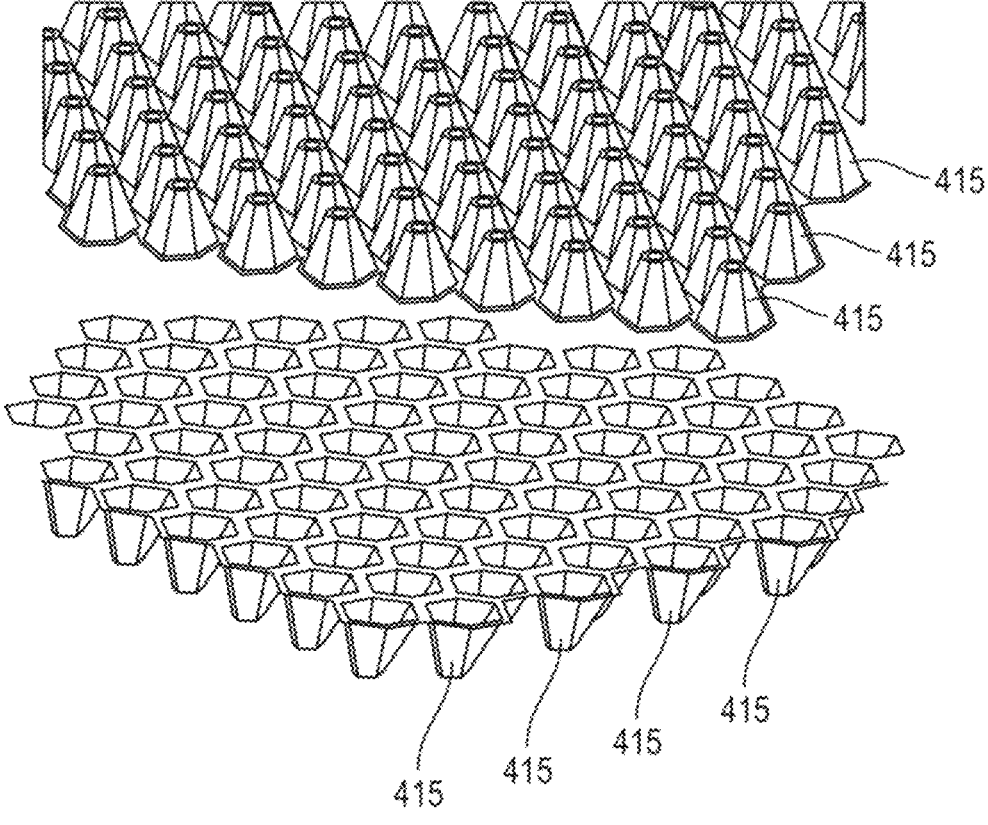
FIG. 3 is a schematic representation of one embodiment of a structure of shapes according to the disclosure.

As can be seen more particularly in FIG. 2, the acoustic structure 407 comprises a cellular structure 409 which comprises a plurality of hollow cells 411 and a structure of shapes 413 which comprises a plurality of protruding shapes 415.

In the example shown, the cellular structure 409 is a honeycomb structure that comprises hollow cells 411 of hexagonal cross-section arranged in a periodic arrangement. It is these hollow cells 401 (i.e., pockets) that are designed to generate an acoustic attenuation in a given frequency range.

In addition, the protruding shapes 415 of the structure of shapes 413 are cones which are also arranged in a periodic arrangement, identical to that of the cells 411 of the cellular structure 409, and the dimensions of which are adapted so that each cone engages into a different hollow cell 411 of the cellular structure 409 when the acoustic treatment device 401 is mounted. The cones are designed to generate, in association with the cellular structure, an acoustic attenuation in a frequency range distinct from that of the cellular structure alone. In particular, this may involve low frequencies that are not sufficiently attenuated by the cellular structure alone.

The disclosure is not limited to a structure of shapes in which the protruding shapes are cones. The geometry of the protruding shapes can be pyramidal, spiral, funnel-shaped or even hopper-shaped in various embodiments. The person skilled in the art will be able to adapt this shape to the attenuation required in a given frequency range and/or to the given mechanical properties required.

The structure of shapes can be made, for example, from thermoplastics such as PAEK (polyaryletherketone), PEI (polyetherimide), PC (polycarbonate), PPS (polyphenylene sulphide) or even PESU (polyethersulfone). It can have variable dimensions, for example, of the order of 1000 by 500 square millimetres, and several structure of shapes can be mounted together to form a larger one if required, for example, by gluing or welding (by ultrasound or laser in particular).

Furthermore, by way of example, the height of the protruding shapes of the structure of shapes can be between 5 and 100 millimetres and the dimensions of the base (i.e., the area located at the level of the plate) of these protruding shapes can be included in a circle with a diameter of between 5 and 50 millimetres. Finally, the thickness of the material forming the protruding shape can be between 0.3 and 0.5 millimetres.

Figure 5A:
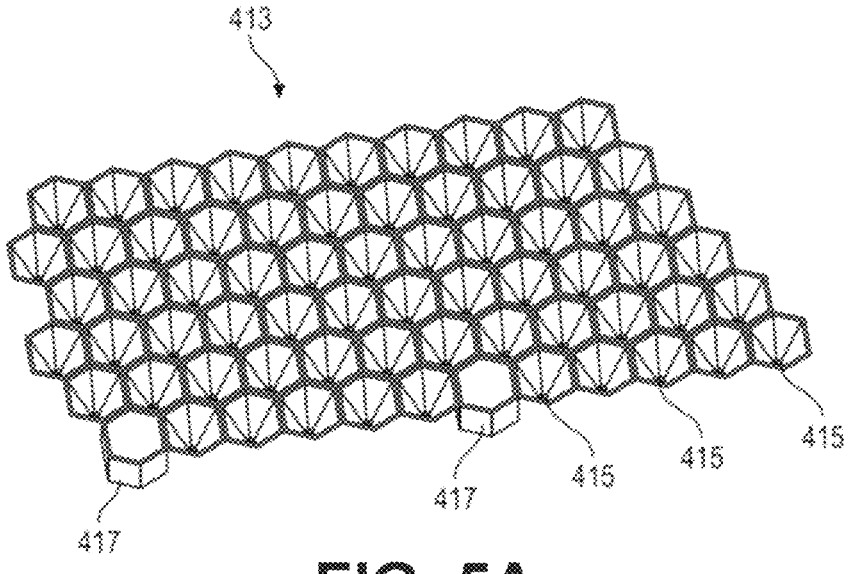
FIG. 5A is a schematic representation of an embodiment of a structure of shapes according to the disclosure.
Figure 5B:
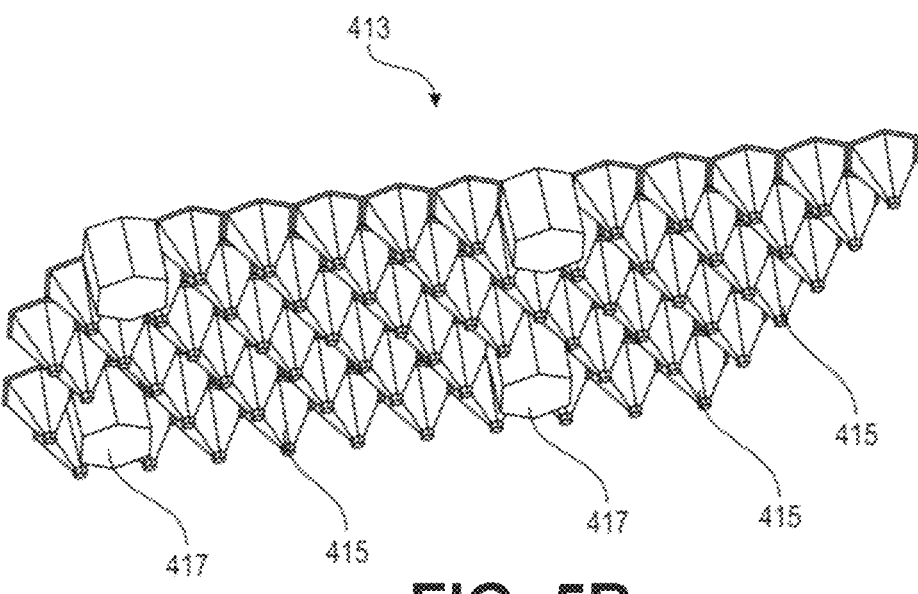
FIG. 5B is a schematic representation of an embodiment of a structure of shapes according to the disclosure.

As can be seen more particularly in FIG. 5A and FIG. 5B, the structure of shapes 413 also comprises stubs 417, which have a shape distinct from that of the protruding shapes 415.

The stubs 417 are designed to fit into the hollow cells 411 (positioned opposite each other at the time of the mounting) of the cellular structure 409. In the example shown, the stubs 417 have a hexagonal cross-section and dimensions that allow them to be fitted.

In general, the shape and arrangement of the stubs 417 are adapted to enable them to be fitted in the hollow cells, including where the shapes of the cells and stubs differ.

Thus, the cellular structure 409 and the structure of shapes 413 are mounted to form the acoustic structure 407 by engaging the protruding shapes 415 into certain hollow cells 411 and by embedding the stubs 417 in other hollow cells 411 of the cellular structure 409. In particular, when the cellular structure 409 and the structure of shapes 413 are mounted, the stubs 417 that fit into hollow cells 411 guide the structure of shapes 413 with at least a part of their external dimensions, which are designed to adjust exactly to the internal dimensions of the opposite hollow cells 411.

As described in more detail below with reference to FIG. 10, it is this cellular structure that is mounted with the two skins to form the complete acoustic treatment devices. By way of example, the total height of the acoustic treatment device, once mounted, may be of the order of 30 millimetres.

In addition, the stubs 417 are designed to enable the acoustic treatment device 401 as an assembly to be attached to a component of the aircraft propulsion assembly. In particular, the stubs can be solid or sufficiently filled so that the material of each stub forms a support element for fastening means.

Figure 8A:
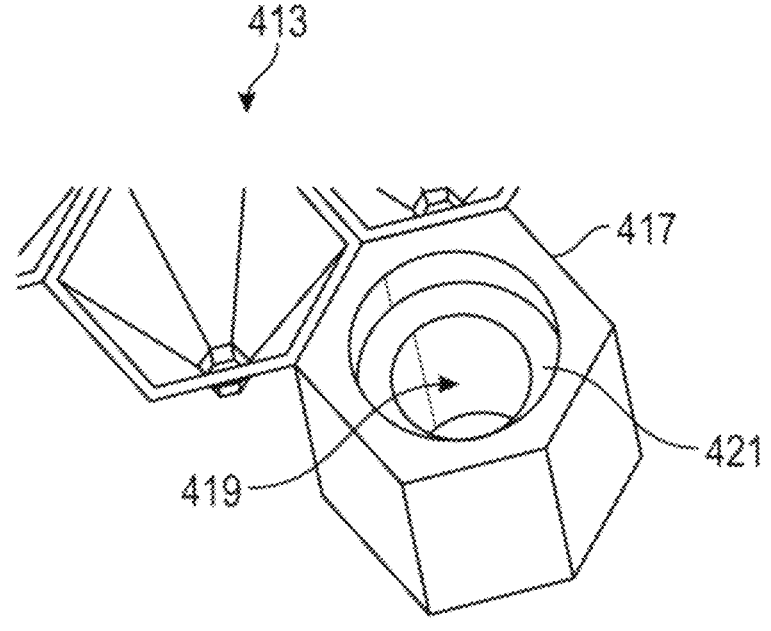
FIG. 8A is a schematic representation of an embodiment of a structure of shapes according to the disclosure.
Figure 8B:
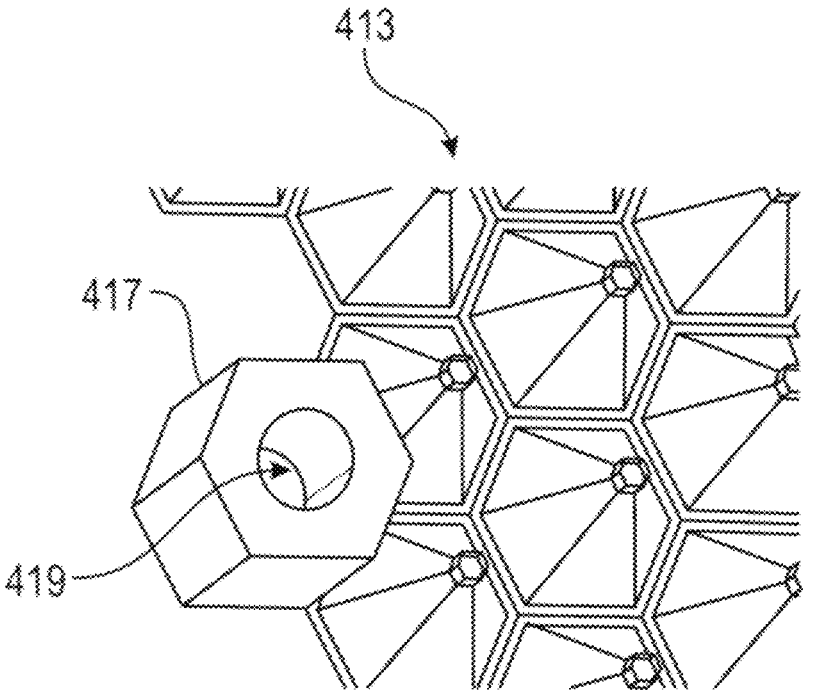
FIG. 8B is a schematic representation of an embodiment of a structure of shapes according to the disclosure.

For example, as can be seen in FIG. 8A and FIG. 8B, which represent a particular embodiment, each stub 417 may comprise a through hole 419 designed to allow the fastening means to pass through such as a screw, for example.

In addition, in this example, the hole 419 comprises a machined portion 421, which may for example be a bore, milling or counterbore, and which is adapted to allow the engagement of a head of the fastening means so that this head does not emerge from the hole 419. Advantageously, therefore, no part of the fastening means is likely to impede an aerodynamic flux when the acoustic treatment device 401 is installed close to a circulation duct of a flux.

In a variant not shown, each stub 417 may also comprise a threaded insert which is designed to enable it to be attached to the component of the aircraft propulsion assembly to which it is intended to be fixed. In this case, the propulsion assembly is attached to the component from the rear. The screw head is then on the side of a casing, for example.

Figure 6A:
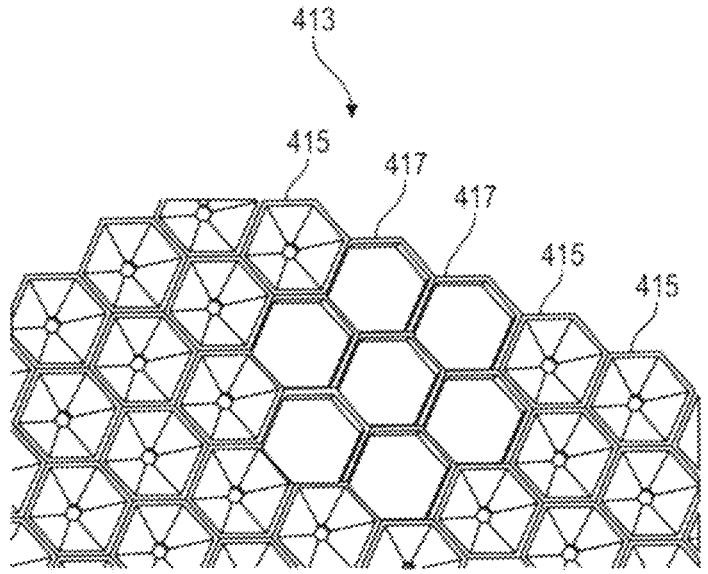
FIG. 6A is a schematic representation of an embodiment of a structure of shapes according to the disclosure.
Figure 6B:
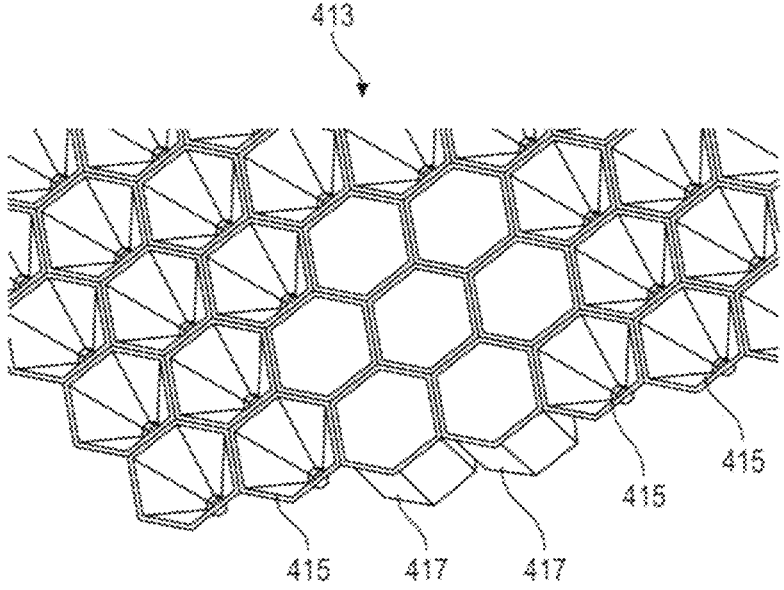
FIG. 6B is a schematic representation of an embodiment of a structure of shapes according to the disclosure.

FIG. 6A and FIG. 6B show an embodiment in which several individual stubs 417 are arranged so that they fit into adjacent cells 411 of the cellular structure.

Generally speaking, in the embodiments shown in FIGS. 5A and 5B on the one hand and FIGS. 6A and 6B on the other hand, the dimensions of each stub 417 of the structure of shapes 413 are designed so that each stub 417 fits into a different hollow cell 411 of the cellular structure 409. In other words, all the hollow cells 411 of the cellular structure 409 have the same dimensions and each stub 417 has dimensions adapted to fit into a single cell.

Figure 7A:
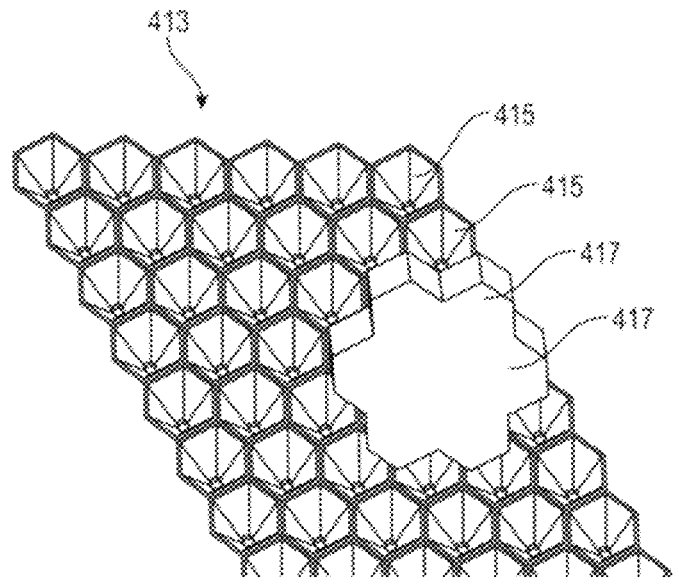
FIG. 7A is a schematic representation of an embodiment of a structure of shapes according to the disclosure.
Figure 7B:
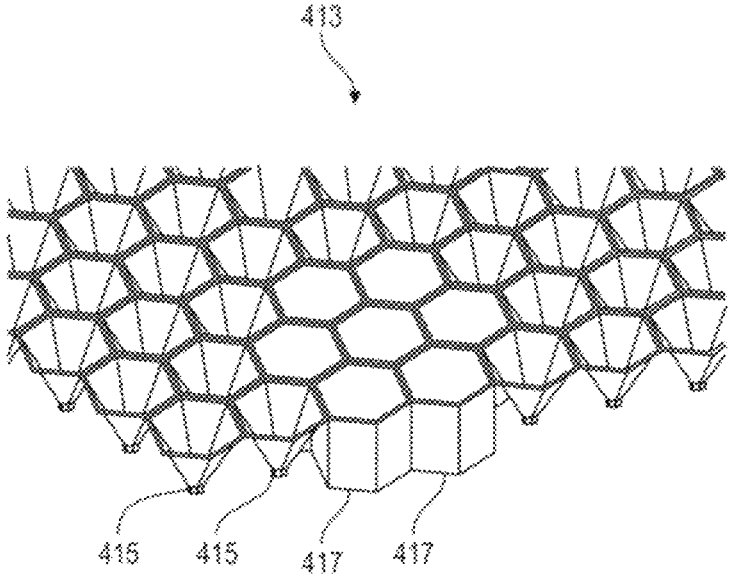
FIG. 7B is a schematic representation of an embodiment of a structure of shapes according to the disclosure.

In an alternative embodiment, as shown in FIG. 7A and FIG. 7B, the dimensions of each stub 417 of the structure of shapes 413 are designed so that each stub 417 fits into a hollow area of the cellular structure 409 formed by several adjacent hollow cells 411. Typically, an area formed by several identical hollow cells 411 of the cellular structure 409 must have been cut out beforehand to allow a single stub 417 to be fitted.

Figure 9:
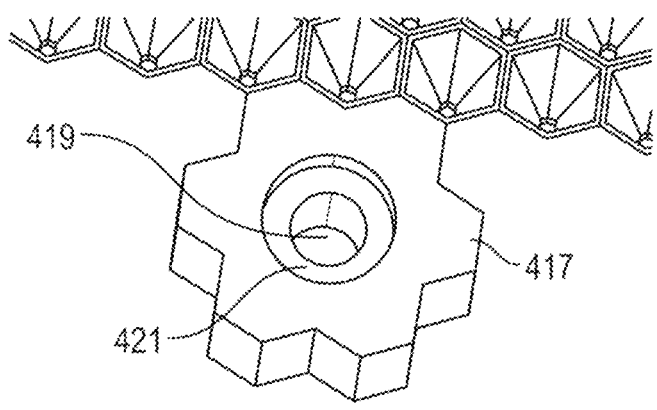
FIG. 9 is a schematic representation of an embodiment of a structure of shapes according to the disclosure; and, FIG. 10 is a flow diagram of steps in a method of manufacturing an acoustic treatment device according to the disclosure.

In addition, in this case as well as in the case where each stub fits into a single cell, as can be seen in FIG. 9, each stub 417 can comprise a through hole 419 designed to allow fastening means to pass through such as a screw, for example.

Similarly, each stub 417 may comprise a machined portion 421, which may for example be a bore, milling or counterbore, and which is adapted to allow engagement of a head of the fastening means so that this head does not emerge from the hole 419.

Figure 10:
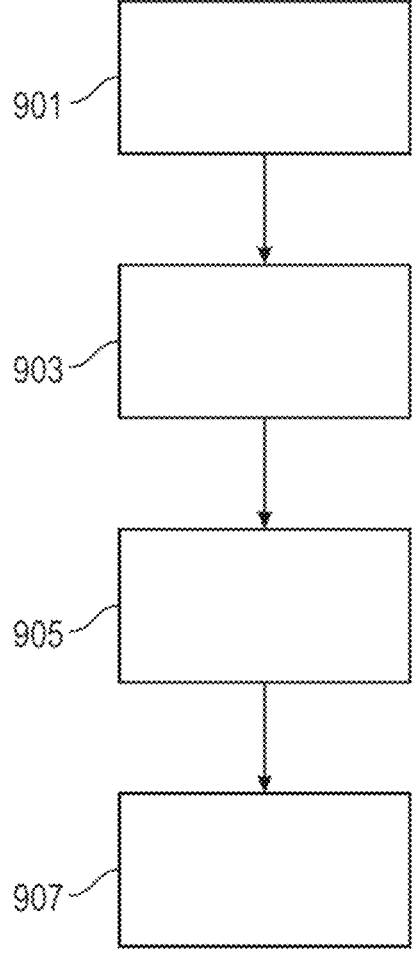

With reference to FIG. 10, we will now describe a method of manufacturing an acoustic treatment device such as that described with reference to FIGS. 2 to 9.

The step 901 consists of manufacturing the structure of shapes. In particular, in different embodiments of the manufacturing method, the structure of shapes can be manufactured, for example, by injection or by stamping and overmoulding or even by additive manufacturing. The injection refers to the injection of a filled or unfilled thermoplastic resin into a closed mould. The stamping and overmoulding refers to the use of a thermoplastic sheet, filled or unfilled, which is stamped to form the stubs.

The step 903 consists of mounting the structure of shapes with the cellular structure to form the acoustic structure. This mounting can be carried out, for example, by gluing or welding.

The step 905 consists of mounting the acoustic structure with the first skin and the second skin to form the complete acoustic treatment device. In the same way as for step 903, this mounting can be carried out, for example, by gluing or welding.

The person skilled in the art will appreciate that the operations of mounting the structure of shapes with the cellular structure and the acoustic structure with the first skin and the second skin can be interchanged in the manufacturing method.

In addition, in the non-limiting example shown, the manufacturing method also includes a step 907 of drilling the acoustic treatment device at the level of the stubs of the structure of shapes in order to form holes which will allow the fastening means to pass through.

Alternatively, or additionally, it is possible that, during the step 901 of manufacturing the structure of shapes, the holes are formed in the stubs of the structure of shapes either from protruding parts of a mould used for the manufacture or from inserts which are positioned in the mould.

Finally, in a particular embodiment of the manufacturing method, during the step 901 of the manufacture of the structure of shapes, the stubs can be produced with an insert positioned in a mould. Advantageously, this can be a mould "conventionally" used for the manufacture of a structure of shapes without stubs, into which it is sufficient to place inserts to allow the stubs to be manufactured.

The invention claimed is:

1. An acoustic treatment device for an aircraft propulsion assembly, the device comprising a first skin and a second skin enclosing an acoustic structure, said acoustic structure having a cellular structure that includes a plurality of hollow cells arranged in a periodic arrangement, and a structure of shapes, comprising a plurality of protruding shapes arranged in the same periodic arrangement, and so that each of said protruding shapes engages in a different hollow cell of the cellular structure, wherein said structure of shapes further comprises at least one stub, of a shape distinct from that of the protruding shapes, the at least one stub being also part of the periodic arrangement and being configured to fit into at least one hollow cell of the cellular structure and to enable the acoustic treatment device to be fixed to a component of the aircraft propulsion assembly.

2. The acoustic treatment device according to claim 1, wherein dimensions of each stub of the structure of shapes are configured so that each stub fits into a different hollow cell of the cellular structure.

3. The acoustic treatment device according to claim 1, wherein dimensions of each stub of the structure of shapes are configured so that each stub fits into a hollow area of the cellular structure formed by several adjacent hollow cells.

4. The acoustic treatment device according to claim 1, wherein each stub comprises a through hole configured to allow fastening means to pass through.

5. The acoustic treatment device according to claim 4, wherein each hole comprises a machined portion configured to allow the engagement of a head of the fastening means so that said head of the fastening means does not emerge from said hole.

6. An acoustic propulsion assembly comprising at least one acoustic treatment device according to claim 1.

7. The acoustic treatment device according to claim 1, wherein the at least one stub is solid.

8. A method of manufacturing an acoustic treatment device according to claim 1, the method comprising the steps of:

manufacturing the structure of shapes;

mounting the structure of shapes with the cellular structure to form the acoustic structure; and mounting the acoustic structure with the first skin and the second skin so as to form the acoustic treatment device.

9. The manufacturing method according to claim 8, further comprising the step of:

drilling the acoustic treatment device at a level of the stubs of the structure of shapes.

10. The manufacturing method according to claim 8, wherein, during the manufacture of the structure of shapes, holes are formed in the stubs of said structure of shapes from protruding parts of a mold or from inserts positioned in a mold.

11. The manufacturing method according to claim 8, wherein, during the manufacture of the structure of shapes, the stubs of said structure of shapes are made with an insert positioned in a mold.

* * * * *